(12) United States Patent
Samii et al.

(10) Patent No.: US 9,952,948 B2
(45) Date of Patent: Apr. 24, 2018

(54) FAULT-TOLERANCE PATTERN AND SWITCHING PROTOCOL FOR MULTIPLE HOT AND COLD STANDBY REDUNDANCIES

(71) Applicant: GM GLOBAL TECHNOLOGY OPERATIONS LLC, Detroit, MI (US)

(72) Inventors: Soheil Samii, Royal Oak, MI (US); Thomas E. Fuhrman, Shelby Township, MI (US); Massimo Osella, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 146 days.

(21) Appl. No.: 15/078,233

(22) Filed: Mar. 23, 2016

(65) Prior Publication Data

US 2017/0277607 A1 Sep. 28, 2017

(51) Int. Cl.
| G06F 11/00 | (2006.01) |
| G06F 11/20 | (2006.01) |
| G06F 11/16 | (2006.01) |

(52) U.S. Cl.
CPC ...... *G06F 11/2033* (2013.01); *G06F 11/1658* (2013.01); *G06F 11/2097* (2013.01); *G06F 2201/805* (2013.01)

(58) Field of Classification Search
CPC ............. G06F 11/1658; G06F 11/2033; G06F 11/2038; G06F 11/2041; G06F 11/2097
See application file for complete search history.

(56) References Cited

U.S. PATENT DOCUMENTS

| 6,085,333 | A | * | 7/2000 | DeKoning | ............... G05B 9/03 707/999.202 |
| 9,667,498 | B2 | * | 5/2017 | Wu | ..................... H04L 41/0896 |
| 2005/0210191 | A1 | * | 9/2005 | Kobayashi | ............ G06F 3/0625 711/114 |
| 2010/0049871 | A1 | * | 2/2010 | Webster | .............. G06F 11/2033 709/245 |
| 2013/0277969 | A1 | * | 10/2013 | Nielsen | .................... H02J 3/386 290/44 |
| 2014/0201577 | A1 | * | 7/2014 | Ohtake | ............... G06F 11/0709 714/48 |
| 2015/0009804 | A1 | * | 1/2015 | Koponen | ............ H04L 41/0695 370/219 |
| 2015/0180719 | A1 | * | 6/2015 | Wu | ..................... H04L 41/0896 709/224 |

* cited by examiner

*Primary Examiner* — Joshua P Lottich
(74) *Attorney, Agent, or Firm* — Quinn IP Law

(57) ABSTRACT

A method for fault tolerant controller readiness. Executing functions by a first controller operating in a primary status mode. Operating in a hot standby status mode by a second controller and mirroring the first controller by executing functions to operate as a redundant controller. Operating in a cold standby status mode by at least one backup controller under normal operating conditions. The second controller is reconfigured while operating under normal operating conditions from the hot standby status mode to the primary standby status mode if a failure occurs in the first controller. Reconfiguring the at least one backup controller operating under normal operating conditions from cold standby status mode to hot standby status mode to operate as a redundant controller in response to the reconfiguring the second controller from the hot standby status mode to the primary status mode.

19 Claims, 7 Drawing Sheets

FAULT-TOLERANCE PATTERN AND SWITCHING PROTOCOL FOR MULTIPLE HOT AND COLD STANDBY REDUNDANCIES

BACKGROUND OF INVENTION

An embodiment relates to fault tolerant control systems.

Systems which provide safety functions typically utilize redundant controllers to ensure safety by shutting down functions that have experienced a fault or failure. If a fault is detected, the controller is shut down or the controller fail silent where no signals are generated by the controller and a secondary controller is reconfigured to become the primary controller.

Some systems try to implement control systems utilizing a fail-operational system where additional controllers are used to ensure that a safe operation can be continued for a duration of time, such as dual duplex controllers or a triple modular redundancy approach. In a dual-duplex approach, if a first controller fails and fails silent, a second controller will be activated and all actuators will switch over to rely on requests from the second controller. Unlike software faults where a fault in one controller would be present in the duplicate controller, hardware faults (e.g., power supply faults, short to ground faults, etc) are typically independent and chances are that the secondary controller won't have the same hardware fault that occurred with the primary controller and can properly operate thereafter. In certain operations, maintaining functionality of a controller is critical where the system requires either an instantaneously takeover of the primary controller responsibilities or a controller must function for a duration of time until another controller can be reconfigured to take over. As a result, systems utilize multiple controllers as backup controllers. Certain critical functions may need to be replicated on three or more controllers in order for the system to tolerate more than one failure in the same drive/operation/ignition cycle. Scaling a dual-duplex pattern towards handling more than one failure may not be cost effective approach given that more than one controller failure may need to be tolerated in a same driving cycle. Therefore, if two controller failures must be tolerated, then four controllers would be required if using a traditional-dual duplex design. Recall that a controller includes either two processors or two cores where functions are executed independently and simultaneously on a respective controller. Alternatively, the control system may include one processor and one independent monitoring module As a result, each controller would have a same function executed by each processor or core within each controller. As a result, if a dual-duplex design is utilized and two controller failures must be tolerated, then three controllers must be utilized and a same function will be executed simultaneously and independently six times which results in costly and inefficient consumption of system resources.

For a triple modular redundancy approach, all controllers execute the same function, but this pattern does not scale well. A formula for determining the number of units to handle the number of failures is 2N+1 where N is the number of failures. Therefore, to handle two failures, five units are required.

SUMMARY OF INVENTION

An advantage of an embodiment is a reduction in the processing load on controllers such that processing resources can be freed up for other operations and an overall processing burden of one more controllers can be decreased. By designating one controller as a primary controller, one controller in hot standby, and another controller in cold standby, only two controllers are required to execute a function simultaneously. The control system and technique described herein maintains a controller in primary status mode and a controller in hot standby status mode such that if a primary controller fails, a controller always be present in the same or similar state as the primary controller and can resume operations of the failed primary controller instantaneously. As a result, a backup controller in cold standby status mode will never switch directly from cold standby status to primary status.

An embodiment contemplates a method for fault tolerant controller readiness. Functions are executed, by a first processor, while operating under non-fault operating conditions. The first controller operates in a primary status mode. The primary controller outputting control signals over a communication network to execute control actions. The second controller operates in a hot standby status mode under normal operating conditions. The second controller mirroring the first controller by executing functions to operate as a redundant controller. At least one backup controller operating in a cold standby status mode under normal operating conditions. The second controller is reconfigured while operating under normal operating conditions from the hot standby status mode to the primary standby status mode if a failure occurs in the first controller. The at least one backup controller operating under normal operating conditions is reconfigured from cold standby status mode to hot standby status mode to operate as a redundant controller in response to the reconfiguring the second controller from the hot standby status mode to the primary status mode.

A fault tolerant control system includes a first controller operating in a primary status mode. The first controller executes function and controls features of devices while operating under non-fault operating conditions. A second controller operates in a hot standby status mode. The second controller mirrors the first controller by functioning as a backup controller executing redundant functions. A third controller operates in a cold standby status mode. The third controller operates in a standby mode not executing the functions. The second controller while operating under normal operating conditions is reconfigured from a hot standby status mode to a primary standby status mode if a failure occurs in the first controller. The third controller while operating under normal operating conditions is reconfigured from a cold standby status mode to a hot standby status mode if the second controller is reconfigured from the hot standby status mode to the primary standby status mode or if a failure occurs in the second controller while operating in hot standby status mode.

A fault tolerant control system includes a first controller operating in a primary status mode. The first controller controls features of devices while operating under non-fault operating conditions. A second controller operates in a hot standby status mode. The second controller mirrors the first controller by functioning as a backup controller executing redundant functions. A plurality of backup controllers operates in a cold standby status mode. Each of the plurality of backup controllers has a prioritized order. The plurality of backup controllers while operating in a cold standby mode does not execute the functions. The second controller while operating under normal operating conditions is reconfigured from a hot standby status mode to a primary standby status mode if a failure occurs in the first controller. Operational backup controller having a highest priority among the plurality of backup controllers is reconfigured from a cold standby status mode to a hot standby status mode if the second controller is reconfigured from the hot standby status mode to the primary standby status mode or if a failure occurs in the second controller while operating in hot standby status mode.

DETAILED DESCRIPTION

Figure 1:
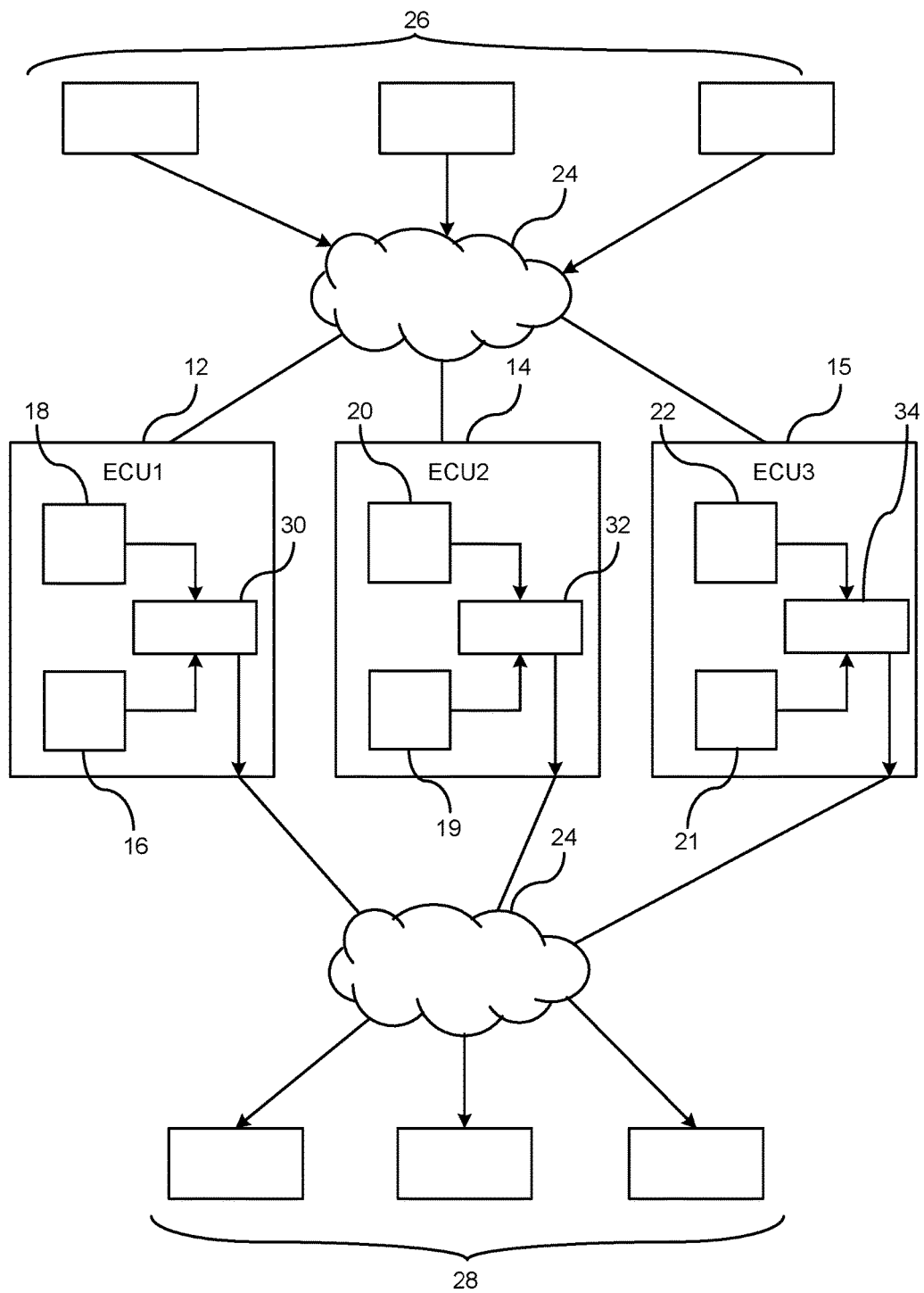
FIG. 1 is an architectural block diagram of an exemplary integrated control system.

The following detailed description is meant to be illustrative in understanding the subject matter of the embodiments and is not intended to limit the embodiments of the subject matter or the application and the uses of such embodiments. Any use of the word "exemplary" is intended to be interpreted as "serving as an example, instance, or illustration." Implementations set forth herein are exemplary are not meant to be construed as preferred or advantageous over other implementations. The descriptions herein are not meant to be bound by any expressed or implied theory presented in the preceding background, detailed description or descriptions, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, (e.g., memory elements, digital signal processing elements, logic elements, look-up tables, or the like, which may carry out a variety of functions under the control of one or more microprocessors or other control devices).

When implemented in software, various elements of the systems described herein are essentially the code segments or computer-executable instructions that perform the various tasks. In certain embodiments, the program or code segments are stored in a tangible processor-readable medium, which may include any medium that can store or transfer information. Examples of a non-transitory and processor-readable medium include an electronic circuit, a microcontroller, an application-specific integrated circuit (ASIC), a semiconductor memory device, a ROM, a flash memory, an erasable ROM (EROM), a floppy diskette, a CD-ROM, an optical disk, a hard disk, or the like.

The system and methodology described herein can be utilized to identify faults in controllers executing software functions in control systems. While the approach and methodology are described below with respect to controllers used in vehicle applications, one of ordinary skill in the art appreciates that an automotive application is merely exemplary, and that the concepts disclosed herein may also be applied to any other suitable communications system such as, for example, general industrial automation applications, manufacturing and assembly applications, and gaming.

The term "vehicle" as described herein can be construed broadly to include not only a passenger automobile, but any other vehicle including, but not limited to, rail systems, planes, off-road sport vehicles, robotic vehicles, motorcycles, trucks, sports utility vehicles (SUVs), recreational vehicles (RVs), marine vessels, aircraft, farming vehicles, and construction vehicles.

There is shown in FIG. 1 an architectural block diagram of an exemplary integrated control system. Such control systems will often utilize two or more controllers so that if a hardware error occurs with a primary controller, then at least one backup controller may be readily enabled to control a feature of the control system or provide control for limited functionality of the feature in error.

In FIG. 1, the control system includes a first controller 12, a second controller 14, and a third controller 15. The exemplary system as described herein is vehicle based, but as described earlier, the architecture can apply to non-vehicular systems. The first controller 12 is designated as the primary controller and includes a dual-core processor that utilizes a first core 16 and a second core 18 for executing primary controls. The second controller 14 is a backup controller includes a dual-core processor that utilizes a first core 19 and a second core 20 that executes redundant functions as the first controller 12. The third controller 15 is also a backup controller that includes a dual-core processor that utilizes a first core 21 and a second core 22 that executes redundant functions as the first controller 12. Alternatively, each respective controller may utilize two processors as opposed to dual-core processors or a single processor with an independent safety monitor/checker. It should be understood that the exemplary architecture is exemplary and the usage of the technique described herein is not limited to systems where the controller utilize dual-processing approaches to implement fail silence. For illustrative purposes herein, the first controller 12, the second controller 14, and the third controller 15 are identical with same hardware and same software. However, certain devices in the architecture may utilize different devices such as different power supplies so that if an error occurs with a controller as a result of a power supply, it does not affect the other controller. The first controller 12 is designated as the master active controller and receives input signals and executes functions based on the input signals and outputs control signals to the other devices over a communication network 24 when in an operational and non-failed state. The first controller 12 operates under non-failure operating conditions (herein referred to as normal operating conditions) and will generate and transmit control signals for controlling features of a vehicle device.

The second controller 14 and the third controller 15 operating as backup controllers receive data and execute functions, but output control signals are not utilized by devices on the control system when the first controller 12 is operating under normal operating conditions.

The first controller 12, the second controller 14, and the third controller 15 communicate via a communication network 24. It should be understood that the communication network may include, but is not limited to, communication area network (CAN), CAN-FD, FlexRay, switched networking with Ethernet, wireless communication, or multiple networks using gates. The requirement is that each of the controllers and sensors/actuators can communication with one another. The first controller 12, the second controller 14, and the third controller 16 utilize the communication network 24 to receive and transmit data between sensors 26 and actuators 28.

Sensors 26 sense for status condition and transmit input signals to the controllers. Upon the first controller 12 receiving the input signals from the sensors 26, each core 16 and 18 of the primary controller 12 simultaneously executes a software function utilizing input data. The first controller 12 outputs a control signal based on the executed function to the actuators 28. The actuators 28 include devices for actuating a feature of the vehicle system. Typically, features are those that are either critical or are required by the vehicle to maintain at least some safe operation of the vehicle. Such control devices may include, but are not limited to braking controls and steering controls. Under a fail-operation condition, functionality to critical devices, although limited, is enabled to allow the driver to safely operate the vehicle until the vehicle can be driven to a location for inspection or allow the vehicle to reach a safe or minimum risk condition.

The first controller 12 includes a comparative module 30, the second controller 14 includes a comparative module 32, and the third controller 15 includes a comparative module 34. Each of the respective comparative modules performs a comparative operation between the outputs results of respective cores within a respective controller. The comparative operation determines whether the results of each executed function from each core within the respective controller are the same or similar since the each core executes a same function utilizing the same input data. It should be understood that although a same/exact execution by the controllers would be optimal, the execution of the controllers do not need to be exact or simultaneous. Whether or not the states match exactly and are the same depends on the amount of synchronization in the system (e.g., a global notion of synchronized time and all controllers have the same knowledge of the "current" time and the primary and hot standby execute the function at the same time and with the same inputs). However, it is understood that the system may not be perfectly synchronized with the exact same state at all times between the primary and hot standby state, and that this technique will apply to systems that include imperfect synchronization which have similar but not identical/exact states. If the cores are operating without error, then the results should be the same. If the results differ, then an error may be present in that respective controller. As a result, each comparative module requires two inputs comparing the executed functional results by each core within the respective controller for determining whether an error occurred in their respective controller. The results are transmitted on the communication network 24 to other devices such as other controllers and actuators on the communication network 24. Both controllers may include a fail-silence decoder/decider module for monitoring error conditions in the other controllers for reconfiguring the controllers should there be a failure.

During the time the first controller 12 is executing functions based on the input data, the second controller 14 and the third controller 15 are mirroring the first controller 12 and are simultaneously executing the same functions based on the same data. This is known as redundancy. The second controller 14 and the third controller 15 mirror the first controller 12 by executing functions in a same state as the first controller 12. This is performed in the event that if an error occurs in the first controller 12, then the second 14 and the third controller 15 must be ready to immediately take over the operations of the first controller 12. To take over operations of the first controller 12 instantaneously, either the second controller 14 or the third controller 15 must be in a same state as primary controller 12. That is, either of the two backup controllers must implement and execute identical functionality simultaneously as the first controller 12 to tolerate a controller failure in the first controller 12. Therefore, it is pertinent that one of the controllers execute critical software redundantly to identify when an error occurs in the first controller 12 and to instantaneously take over controlling operations should the primary controller fail (i.e., fail-silent). This requires that the backup controller be operating in a same state such that no latency is present in reconfiguring the backup controller as the primary controller. Latencies would occur if a respective backup controller were not operating in the same state as the primary controller when a failure occurs. Such an occurrence would require the backup controller to determine which state the primary controller is operating in and then start to execute functions to catch up to where the primary controller was at when the error was detected. Such a delay in a critical operation (e.g., autonomous driving operation) is unwanted and can lead to unsafe operation if the primary controller cannot maintain functionality until the backup controller can come up to speed and take over the operations.

Figure 2:
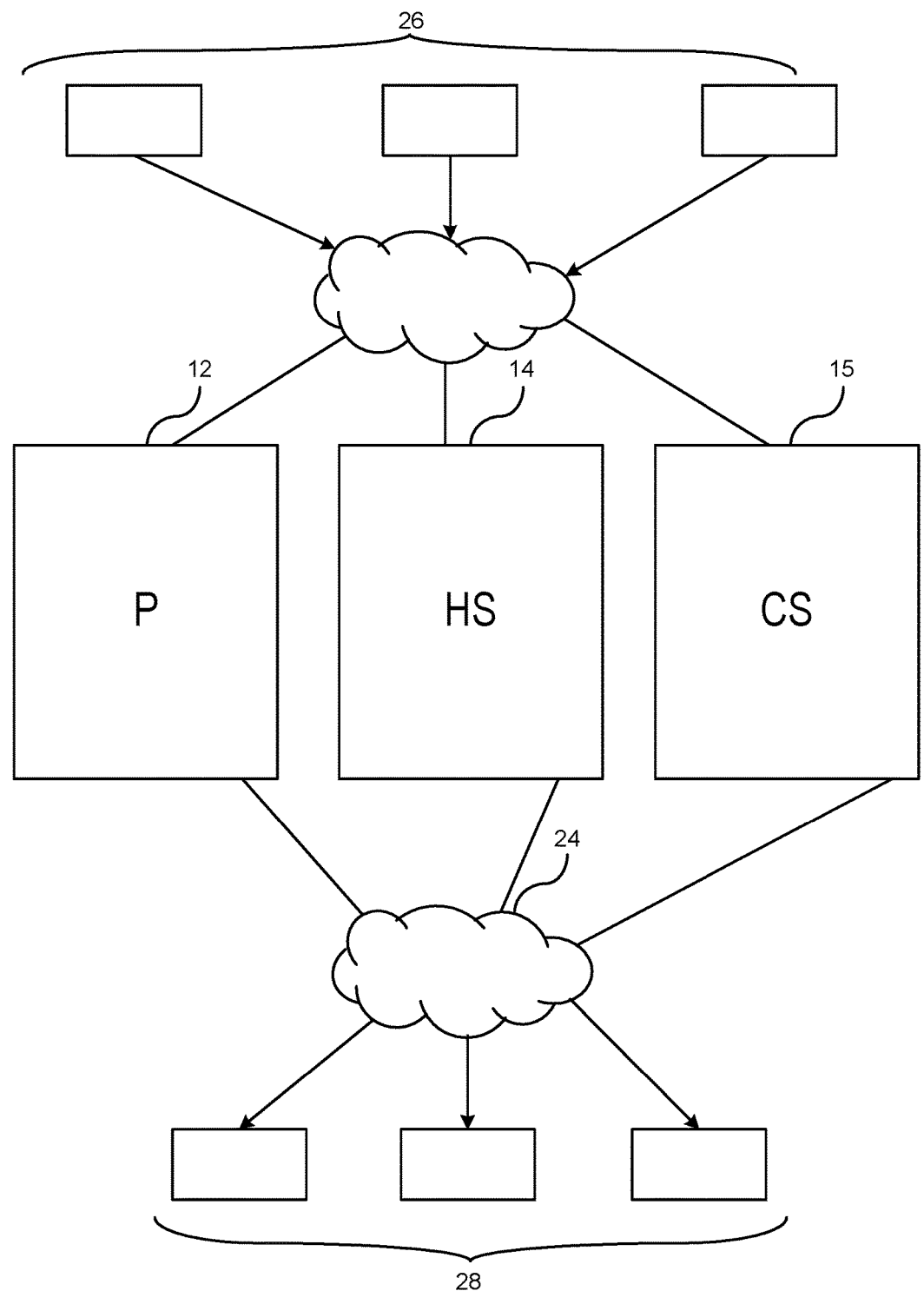
FIG. 2 is an initial configuration of controllers operating in a non-faulted state.

The following FIGS. 2-5 will use similar element numbers as shown in FIG. 1 for consistency purposes. As shown in FIG. 2 while the control system is operating under normal operating conditions, the first controller 12 operates in primary status mode (P), the second controller 14 operates under the hot standby status mode (HS), and the third controller 15 operates under the cold standby status mode (CS). The third controller 15 while operating in the cold standby status mode (CS) is not redundant in the sense of not actively mirroring the first controller 12. Rather, the third controller 15 can be dormant until needed or can be allocated for other use by another system if desired while the other controllers are operating under normal operating conditions. As a result, system resources are saved or re-allocated for more efficient use of the third controller 15. Therefore, the first controller 12 receives input signals from sensors 26 and actively executes functions and provides control signals to actuators 28 and other devices in the control system via the communication network 24 while the second controller 14 operates in a redundant mode mirroring the first controller 12. Should the first controller 12 or second controller 14 have a fault, the third controller 15 will be reconfigured to another status mode as will be discussed below.

Figure 3:
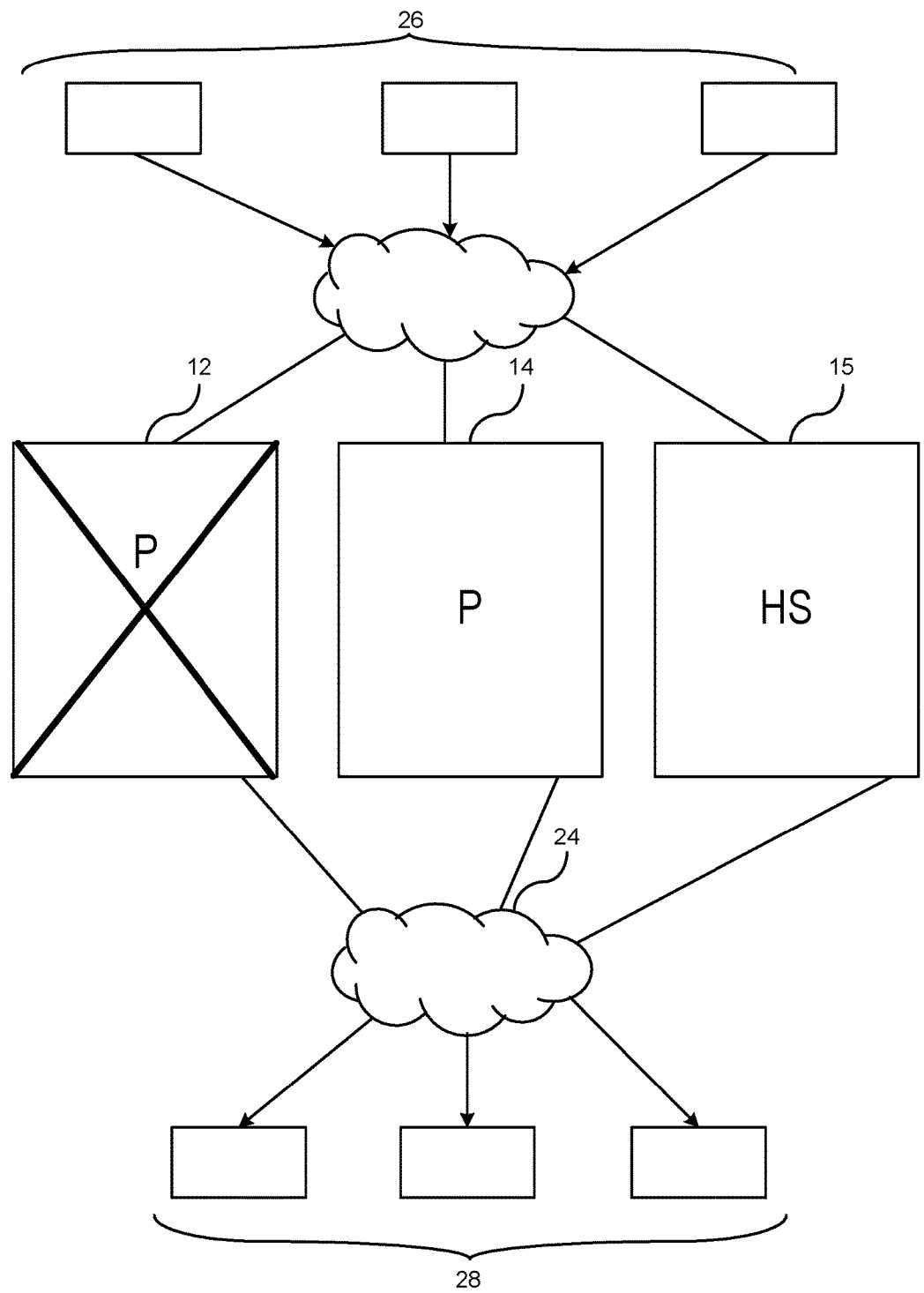
FIG. 3 illustrates an example of a failed primary controller and a reconfiguration of a backup controller.

FIG. 3 illustrates an exemplary condition of an error occurring in the first controller 12 which is originally dedicated as the primary controller. If the error condition is determined to be critical, the first controller 12 will preferably enter a fail-silent condition where no communications are transmitted by the first controller 12. Upon the second controller 14 detecting that the first controller 12 has faulted and is in fail-silent mode, the second controller 14 will be reconfigured as the primary controller. Since the second controller 14 is in the hot standby status mode (HS), the second controller 14 operates in the same/similar state that the first controller 12 was operating in when the error occurred. As a result, the second controller 14 can be reconfigured to instantaneously take over the execution of the functions of the primary controller. Actuators 28 and other devices on the communication network 24 will identify the second controller 14 as the primary controller for receiving control signals therefrom. The first controller 12 enters fail-silent mode and will no longer communicate with actuators 28 and other devices.

Figure 4:
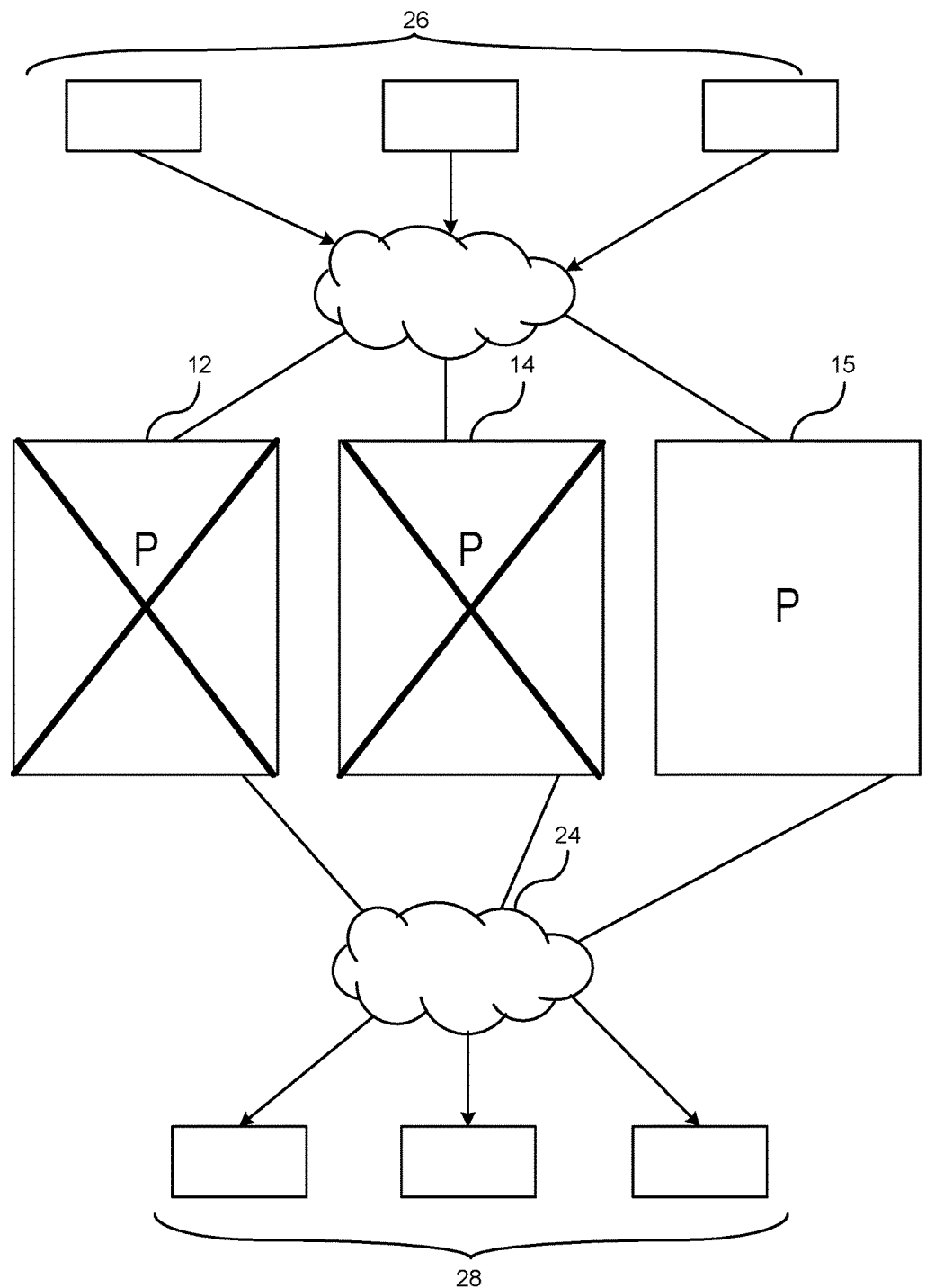
FIG. 4 illustrates an example of a failed backup controller and reconfiguration of a next backup controller.

Referring again to FIG. 3, in response to the first controller 12 faulting and entering a fail-silent mode and the second controller 14 being reconfigured as the primary controller, the third controller 15 is reconfigured from cold standby status mode (CS) to hot standby status mode (HS). The third controller 15 will then determine the state that the second controller 14, now functioning as the primary controller, is operating in and will start to mirror the second controller 14 for executing functions. The third controller 15 becomes a dedicated controller by executing functions redundantly and simultaneously with the second controller 14. As a result, the third controller 15 becomes an active backup controller 15 to the second controller 14. Thereafter, should the second controller 14 fault, as shown in FIG. 4, the second controller 14 will fail-silent, and the third controller upon detecting the fault in the second controller 14 will be reconfigured as the primary controller (P). As a result, the first controller 12 and second controller 14 will essentially be withdrawn from the control system and the third controller 15 will instantaneously take over operations and control that was previously maintained by the second controller 14.

Figure 5:
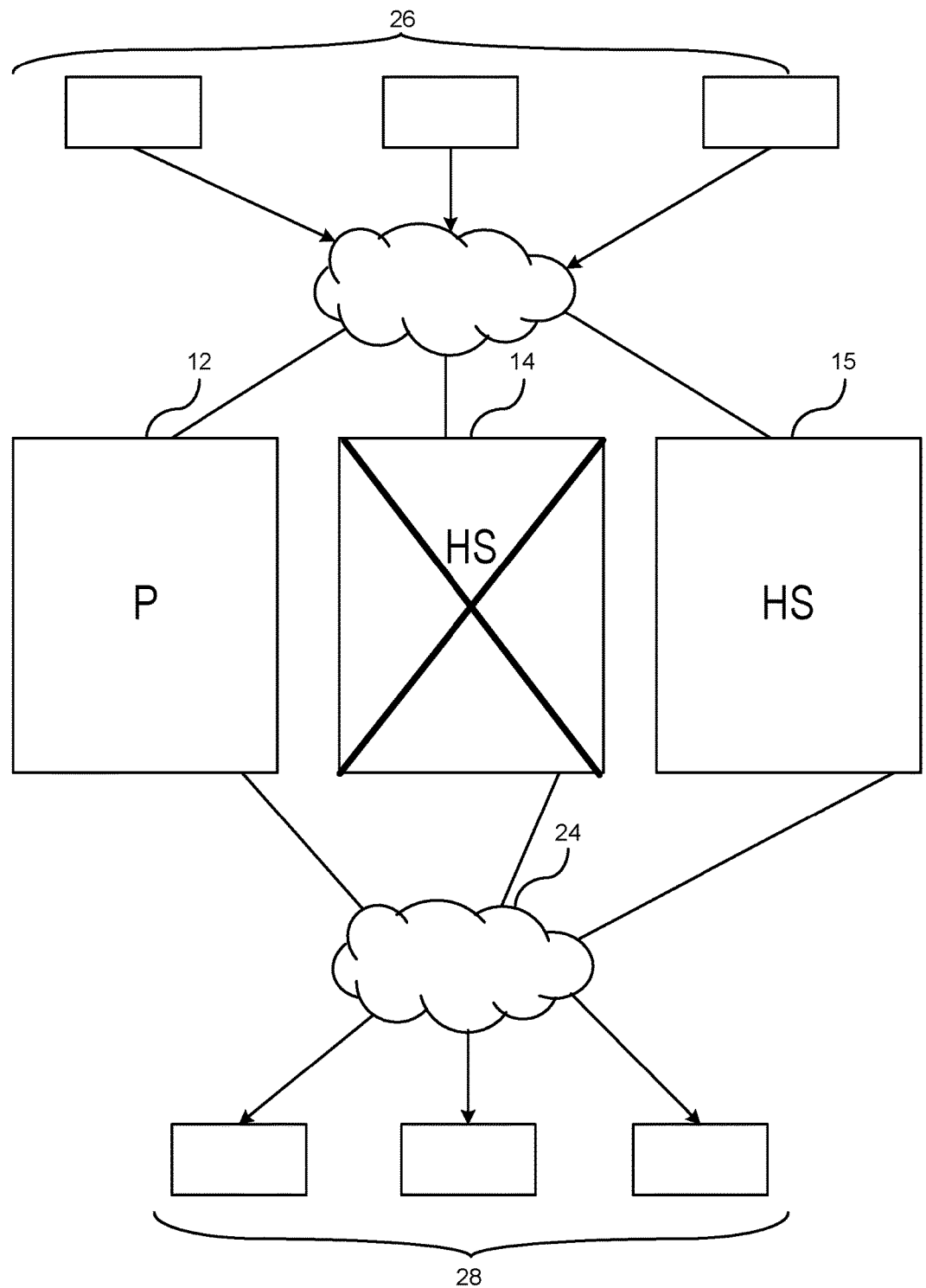
FIG. 5 illustrates an example of failure of another backup controller and reconfiguration of a backup controller.

FIG. 5 is an example of an error occurring in the second controller 14 currently operating in a hot standby status mode (HS). In FIG. 5, the first controller 12 and the third controller 15 are operating under normal operating conditions and an error is detected in the second controller 14. The second controller 14 enters a fail-silent mode. If the first controller 12 fails while the third controller 15 is presently in cold standby status mode (CS), then a delay would be occur in reconfiguring the third controller 15 from the cold standby status mode (CS) to a primary status mode (P). That is, since the third controller 15 is not mirroring the first controller 12, the third controller 15 must determine the state that that the first controller 12 is operating in when the fault occurred. Therefore, a period of time would be required to reconfigure the third controller 15 to set parameters and enter the same state as the first controller 12 when a fault occurs in the first controller 12. To assure that there is no latency in reconfiguring the third controller 15 should this condition occur, once the error is detected in the second controller 14, the third controller 15 is reconfigured to a hot standby status mode (HS). Some time may be required to reconfigure the third controller 15 to this respective status mode, however, this reconfiguration is performed while the first controller 12 is functioning as the primary controller under normal operating conditions. After the third controller 15 is successfully reconfigured to hot standby status mode (HS), the third controller 15 will mirror the first controller 12 by redundantly and simultaneously executing the same functions as the first controller 12.

Figure 6:
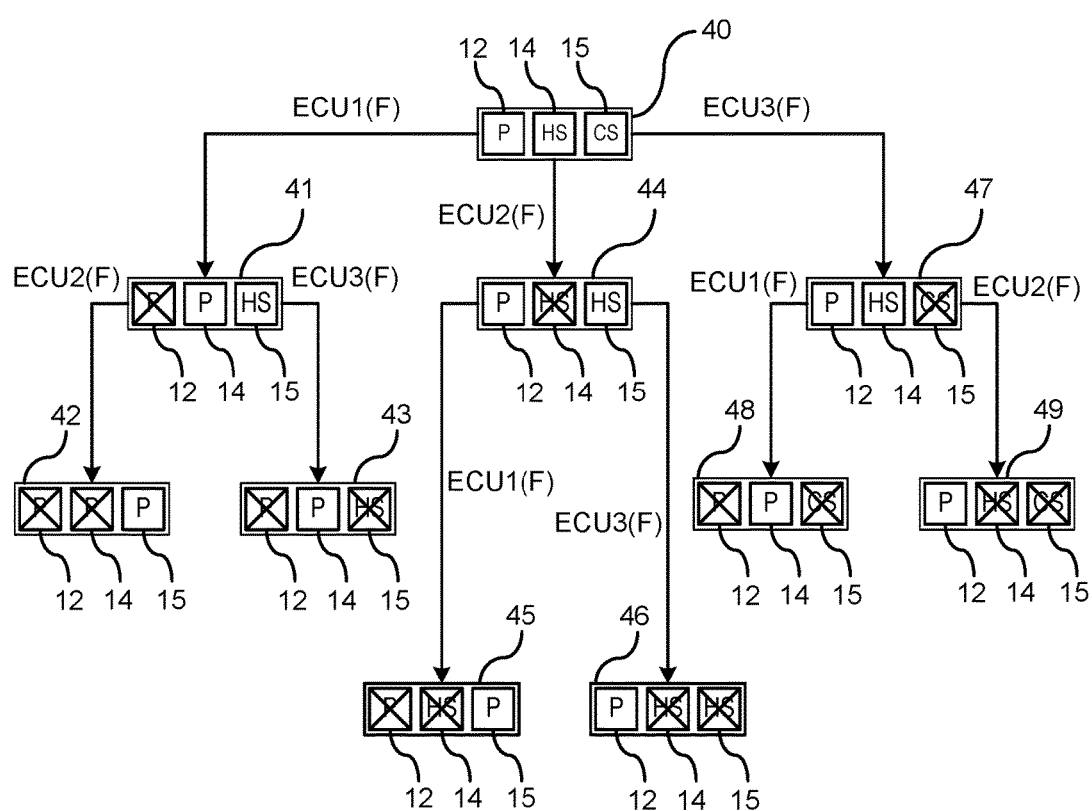
FIG. 6 illustrates comprehensive switching flow diagram for an exemplary three controller control system.

FIG. 6 illustrates comprehensive switching flow diagram providing combination and sequences for reconfiguring each of controller's status when three controllers are utilized.

In block 40, all respective controllers are operating under normal operating conditions where the first controller 12 is in primary status mode (P), the second controller 14 is in hot standby status mode (HS), and the third controller 15 is in cold standby status mode (CS).

In block 41, the first controller 12 fails and the first controller 12 enters a fail-silent mode. The second controller 14 detects the failure of the first controller 12 and is reconfigured to primary status mode (P) in response to detecting the failure. The reconfiguration is instantaneous or has minimal latency since the second controller 14 is mirroring the first controller 12. In addition, the third controller 15 is reconfigured from cold standby status mode (CS) to hot standby status mode (HS), where the third controller 15 mirrors the second controller 14.

In block 42, after the reconfiguration shown in block 41, an error is detected in second controller 14 and the second controller 14 enters a fail-silent mode. The third controller 15 detects the failure of the second controller 14 and is reconfigured from hot standby status mode (HS) to primary status mode (P) in response to detecting the failure. The reconfiguration is instantaneous or has minimal latency since the third controller 15 is mirroring the second controller 14. No backup controllers are available after two of the three controllers fail.

In block 43, after the reconfiguration shown in block 41, an error is detected in third controller 15 and the third controller 15 enters a fail-silent mode. Both the first controller 15 and the third controller 15 enter a fail-silent mode. The second controller 14 already operating in the primary status mode (P) continues to function as the primary controller. No backup controllers are available after two of the three controllers fail.

Referring again to block 40, an error is detected in the second controller 14 and the flow diagram proceeds to block 44. Block 44 represents the reconfiguration in response to the second controller 15 faulting after each of the controllers were operating under normal operating conditions. The second controller 14 fails and enters a fail-silent mode. The first controller 12 continues to operate as the primary controller since normal operating conditions are present therein. The third controller 15 detects the failure of the second controller 14 and is reconfigured from cold standby status mode (CS) to hot standby status mode (HS). After reconfiguration, the third controller 15 mirrors the first controller 12.

In block 45, after the reconfiguration shown in block 44, an error is detected in first controller 12 and the first controller 12 enters a fail-silent mode. The third controller 15 detects the failure of the first controller 12 and is reconfigured from hot standby status mode (HS) to primary status mode (P) in response to detecting the failure. The reconfiguration is instantaneous since the third controller 15 is mirroring the first controller 14. No backup controllers are available after two of the three controllers fail.

In block 46, after the reconfiguration shown in block 44, an error is detected in third controller 15 and the third controller 15 enters a fail-silent mode. Both the second controller 14 and the third controller 15 are now in fail-silent mode. The first controller 12 already operating in the primary status mode (P) continues to function as the primary controller. No backup controllers are available after two of the three controllers fail.

Referring again to block 40, an error is detected in the third controller 15 and the flow diagram proceeds to block 47. Block 47 represents the reconfiguration in response to the third controller 15 faulting after each of the controllers were operating under normal operating conditions. The third controller 14 fails and enters a fail-silent mode. The first controller 12 continues to operate as the primary controller since normal operating conditions are present therein. The second controller 14 continues to operate in hot standby status mode (HS) since normal operating conditions are present therein.

In block 48, after the reconfiguration shown in block 47, an error is detected in first controller 12 and the first controller 12 enters a fail-silent mode. The second controller 14 detects the failure of the first controller 12 and is reconfigured from hot standby status mode (HS) to primary status mode (P) in response to detecting the failure. The reconfiguration is instantaneous since the second controller 14 is mirroring the first controller 12. No backup controllers are available after two of the three controllers fail.

In block 49, after the reconfiguration shown in block 47, an error is detected in second controller 14 and the second controller 14 enters a fail-silent mode. Both the second controller 14 and the third controller 15 are in a fail-silent mode. The first controller 12 already operating in the primary status mode (P) continues to function as the primary controller. No backups are available after two of the three controllers fail.

It should be understood that any amount of backup controllers can be utilized and that the desired approach is to have a single primary controller, a single backup controller operating in hot standby status mode (HS), and one or more backup controllers operating in cold standby status mode (CS) where those backup controllers operating in cold standby status mode (CS) are dormant or can be utilized for other processing resources until an error occurs and reconfiguration by one or more controllers. Reconfiguration is done after a controller failure such that one of the remaining operational controllers is operating in primary status mode and another one of the remaining operational controllers is operating in a hot standby mode. That is, only a hot standby can reconfigure to become primary, and only a cold standby can reconfigure to become hot standby.

Two alternative approaches to implement a reconfiguration are described herein. The first approach is a decentralized approach and the second approach is a centralized approach. In the decentralized approach, each controller implements logic to detect failure of any other controller in the system and reconfigure to primary or hot standby status if necessary. In the centralized approach, a master controller detects failures of all other controllers in the system, and determines which controller should reconfigure to primary status and which controller should reconfigure to hot standby status. When this determination is made, the master controller notifies the respective controller to reconfigure and change their operating status to primary and hot standby, respectively. Further in this centralized approach, a backup master controller monitors the health of the master controller and, if the master controller fails, the backup master will become master controller and assign another controller in the system to become the backup master controller. The master controller communicates its state to the backup master controller for consistency.

The following describes logic for the decentralized approach implemented for selecting a respective primary and/or backup controller for reconfiguration. That is, if three or more controllers are utilized, then each controller needs to determine its order as to when a respective order transitions from a cold standby status mode (CS) to a hot standby status mode (HS) and from a hot standby status mode (HS) to a primary status mode (P).

The notations for the following description are as follows. Given a software component of function A, A is allocated to a set of controllers denoted Controllers_A (the number of controllers is denoted N_Controllers_A and depends on the fault tolerance requirement of function A (i.e., N_Controllers_A−1 failures are handled). Also a one-to-one mapping between Controllers_A and $\{1, \ldots, N\_Controllers\_A\}$ is given and denoted Order_A. For example, Order_A (Controllerx)=1 means that A is executed on Controllerx during normal, fault-free operation. In another example, Order_A(Controllerx)=3 means that A is the second backup and will be the primary only after two controller failures. The mode of A on a given controller Controllerx (i.e., which belongs to the set of controllers Controllers_A) is denoted mode(A, Controllerx) and is a value in the set {Primary, Hot, Cold}. Furthermore, each controller Controllerx belonging to Controllers_A has the capability to detect failure of all other controllers in Controllers_A. While this example describes the controller as failing fail-silent, the technique described herein applies to systems in which controllers are not fail silent but in which controllers are able to detect failures by other mechanisms to detect controller_failures. It should also be understood that this technique can be extended to more than one function. For example if another function is added (e.g., function B), the values are assigned to the variables Controllers_B, N_Controllers_B, and Order_B. As a result, any number of functions may be supported by just providing provide values of Controllers_X, N_Controllers_Xi, and Order_X for each function X that is added. The state variables for function A maintained by the controllers, according to the descriptions below for the decentralized and centralized approach, need to be replicated for each new function X. Notable examples of such state variables for each function X are mode(X, Controllerx), Num_Controller_Failures_X, Num_HigherPrio_ Controller_Failures_X, Operational_Controllers_X, and OperationalOrder_X.

Initially, when each of the controllers (e.g., ECUs) are operating under normal operating conditions, the following initial parameters are set in each controller Controllerx:
mode(A, Controllerx)=Primary if Order_ A(Controllerx)=1
mode(A, Controllerx)=Hot if Order_A(Controllerx)=2
mode(A, Controllerx)=Cold if Order_A(Controllerx)>2
Counter Num_Controller_failures_A is initialized to 0
Counter Num_HigherPrio_Controller_Failures_A is initialized to 0.

Each of the controllers is assigned a predetermined priority number (given by the order Order_A) that is used to determine whether a respective controller should change their status mode. For example, a controller with a priority number equal to 1 is assigned the primary controller. A controller with a priority number equal to 2 is backup controller in hot standby status mode. All other numbers having a priority number greater than 2 are backup controllers functioning in cold standby status mode. In addition, the counter for total controller_failures is set to 0. Each controller maintains a priority failure counter that keeps track of controllers having failures whose priority is greater than the current controller keeping track. This priority counter is also set to zero. Recall that each controller maintains its own counts of the total number of controller failures and controller failures having a higher priority than itself. As a result, the count for the number of total failures should be the same for all controllers maintaining; however, the count for the failed controllers having a priority number greater than the monitoring controller will be different.

The following logic sequence describes a decentralized approach where each of the logic functions for determining when a controller should reconfigure itself is executed locally by each controller, denoted Controllerx, since each controller is aware of the all controller failures in the control system. Upon detection of a failure in a respective controller for a set of controllers (represented by the set Controllers_A-{Controllerx}) having assigned priorities, the following logic is utilized (the failed controller is denoted Controller_failed):

(a) Increment Num_Controller_failures_A;
(b) If, for failed controller Controller_failed, Order_A(Controller_failed)<Order_A(Controllerx), then Increment Num_HigherPrio_Controller_Failures;
(c) If Order_A(Controllerx)−Num_HigherPrio_Controller_failures_A=1, then set mode(A, Controllerx) to Primary;
(c) If Order_A(ECUx)−Num_HigherPrio_Controller_failures_A=2, then set mode(A, Controllerx) to Hot;
(e) Report Num_Controller_failures to application layer.

In step (a), upon detection of a failure, the total count is incremented. In addition, the controller that failed is also identified.

In step (b), if the controller that failed has a priority number that is less than the priority number of the monitoring controller determining the count (recall that all controllers will be executing each of these steps and maintaining its own counts), then that monitoring controller increments a higher priority failure count. That is, a priority number that is less than another priority number indicates that the former has a higher priority (i.e., it has precedence in terms of becoming primary or hot standby). The higher priority failure count assists the current controller in identifying the number of controllers that are still functioning under normal operating conditions that have a higher priority (i.e., earlier precedence order) than the monitoring controller. This allows the monitoring controller to determine whether it should be reconfigured to the hot standby status mode (HS) or the primary status mode (P).

In step (c) if the difference between priority number of the monitoring controller and the higher priority failure count as maintained by the current controller is equal to 1, then the current controller is reconfigured to primary status mode (P).

If the count is not equal to 1, then in step (d) a check is made whether the difference is equal to 2. If the count is equal to 2, then the monitoring controller is reconfigured to the hot standby status mode (HS). If the difference is greater than 2, the monitoring controller remains in cold standby status mode (CS).

In step (e), a notification of the controller failure is reported to the application layer. In addition, notification may be in the form of a report that is generated, or a user (e.g., driver) may be alerted of the failure through a warning (visual, audible, haptic), a telematics message may be provided to a third party that monitors faults on the control system, writing register values to make information about the failure available to a software application, or a message sent to other controllers over the communication network. The correct system response to the controller failure notification is application dependent.

The following represents a centralized approach to executing the logic for determining a sequential order of reconfiguring controllers. The following additional notation and assumptions are applied for the centralized approach:
(1) One-to-one mapping Order_Master_Controllers from a set of controllers Master_Controllers (of cardinality N_Master_Controllers) to {1, . . . ,N_Master_Controllers} (the inverse mapping is denoted Order_Master_ECUs');
(2) Each master controller Controller_m is able to detect failure of any controller in the union of Controllers_A and Master_Controllers (with the exception of Controller_m itself);
(3) Current master controller is denoted Current_Master_Controller;
(4) Current backup master controller is denoted Current_Backup_Master_Controller, The approach is as follows: The variables Current_Master_Controller and Current_Backup_Master_Controller, respectively, identify the master controller and current backup master controller at any point in time of system operation. Initially, when no faults/failures are present, Current_Master_Controller is the controller given by Order_Master_Controllers'(1) (i.e., the first in order). Current_Master_Controller makes the following initializations (when no faults/failures are present) for each controller Controllerx in the set Controllers_A:
  mode(A, Controllerx)=Primary if Order_A(Controllerx)=1
  mode(A, Controllerx)=Hot if Order_A(Controllerx)=2
  mode(A, Controllerx)=Cold if Order_A(Controllerx)>2.

In addition, the following initial parameters are set for the master controller when no faults/failures are present in the system:
  Counter Num_Controller_Failures_A is initialized to 0;
  Set FailedControllers_A is the empty set;
  Initialize Num_Master_Controller_Failures=0;
  Initialize Current_Backup_Master_Controller=Order_Master_Controllers'(2).

Reconfiguration subroutine (RS) as follows is executed by Current_Master_Controller upon failure detection of a controller (denoted by Controller_failed) in the set Controllers_A-{Current_Master_Controller}:
  Increment Num_Controller_Failures_A;
  Assign OrderFailed=Order_A {Controller_failed};
  Operational_Controllers_A=Controllers_A-{Controller_failed};
  Define one-to-one mapping OperationalOrder_A from Operational_Controllers_A to {1 . . . , N_Operational_Controllers_A} where N_Operational_Controllers_A is the cardinality of Operational_Controllers_A, and, for a given controller Controllerx in Operational_Controllers_A, define according to the following:
  OperationalOrder_A(Controllerx)=Order(Controllerx) if Order_A(Controllerx)<OrderFailed;
  OperationalOrder_A(Controllerx)=Order(Controllerx−1) if Order_A(Controllerx)>OrderFailed;
  If mode (A, Controller_failed)=Primary, then
  Assign mode (A, OperationalOrder_A'(1))=Primary;
  Assign mode (A, OperationalOrder_A'(2))=Hot;
  If mode (A, Controller_failed)=Hot, then
  Assign mode(A, OperationalOrder_A'(2))=Hot; Assign Controllers_A=
  OperationalControllers_A and assign Order_A=OperationalOrder_A;
  Report Num_Controller_Failures to application layer;
  Communicate to Current_Backup_Master_Controller, the following
  state: mode, Controllers_A, Order_A, Num_Controller_Failures,
  Num_Master_Controller_Failures.

The reconfiguration subroutine RS works as follows. A counter is incremented to keep track of the number of controllers that have failed during system operation. This counter only considers those controllers that host the function A. Thereafter, the order of the failed controller is recorded, based on the given static order of precedence. Then, a new precedence order is constructed by considering the remaining operational controllers (i.e., the order that is remaining after the controller failed). If the failed controller was operating in primary status mode, then this newly constructed order is used by the current master controller to determine which controller should be in primary status mode and which controller should be in hot standby mode. If on the other hand the failed controller was operating in hot standby mode, then the master controller only needs to check the newly constructed order to determine the controller that should enter hot standby mode. Following these determinations, the current master controller will report the number of controller failures to the application layer, and then communicate the state variables to the current backup master controller. This last communication is needed to enable the current backup master controller to correctly take over the role as master controller should the current master controller fail. These failure modes and handling are described in the following paragraphs.

The above represents normal operating conditions which is defined as the master controller operating fault-free and monitoring faults of other controllers executing function A and informing other controllers when to switch their execution mode in the event of a controller failure.

To detect master controller and backup master controller failures, additional routines make sure that the current backup master takes over control in the event a current master controller fails, and also that there is always at least one backup master controller ready to take over if a respective master controller fails.

The following logic is executed by Current_Master_Controller to monitor backup master controllers and to reassign responsibilities among the backup master controllers. Upon detection of failure of a controller in the set Master_Controllers-{Current_Master_Controller}, the following logic is applied:

(a1) Increment counter Num_Master_Controller_Failures;
(a2) If the failed controller is Current_Backup_Master_Controller, then
 Assign Current_Backup_Master_Controller to be the first operational (i.e., non-failed) controller in the ordered set
 {Order_Master_Controllers'(Num_Master_Controller_Failures+2),
 Order_Master_Controllers'(Num_Master_Controller_Failures+3), . . . ,
 Order_Master_Controllers'(N_Master_Controllers)};
(a3) Communicate to Current_Backup_Master_Controller, the following state: mode, Controllers_A, Order_A, Num_Controller_Failures, Num_Master_Controller_Failures, In step (a1), in response to detection by the current master controller of a fault of a backup controller, the total number of failures of master controllers is incremented within a counter that is maintained by the current master controller.

In step (a2), a determination is made by the current master controller as to whether the failure happened in the current backup master controller (Current_Backup_Master_Controller). If so, then the current master controller assigns the responsibility of the backup master controller to a next controller having the next highest priority among backup master controllers. This controller is now the Current_Backup_Master_Controller.

In step (a3) the current master controller informs the new current backup master controller of the value of the count of the total failures (Num_Master_Controller_Failures) as the new current backup master controller must also maintain a count in the event the master controller fails. All other state variables are also communicated.

In addition to the current master controller monitoring failures of all the backup master controllers, the current backup master controller must monitor the current master controller for failures. The following provide a routine for detection of a failure of current master controller (Current_Master_Controller) followed by selection of new master and backup master controllers. The following routine is applied by the current backup master controller upon detection of failure of Current_Master_Controller (b1) Denote the failed controller by Controller_failed=Current_Master_Controller and switch role to become the new current master controller
(b2) Increment counter Num_Master_Controller_Failures;
(b3) Assign Current_Backup_Master_Controller to the first operational controller in the ordered set;
 Order_Master_Controllers'(Num_Master_Controller_Failures+2);
 Order_Master_Controllers'(Num_Master_Controller_Failures+3);
Order_Master_Controllers'(N_Master_Controllers);
(b4) Execute reconfiguration subroutine (RS).

In step (b1), a detection of a current master controller failure is detected and the current backup master controller becomes the new master controller. In step (b2), in response to a detection of the failed master controller, the counter of the Num_Master_Controller_Failures is incremented. This maintains a count of the number of master and backup master controllers that have failed. In step (b3), the next operational (non-failed) backup master controller in the given precedence order is assigned to take the role of being the current backup master controller. In step (b4), the reconfiguration subroutine is executed to make sure that appropriate reconfiguration is done in case the failed controller hosted function A in primary, hot, or cold standby mode, as well as to make sure that the new backup master controller receives the current state of the master controller.

Figure 7:
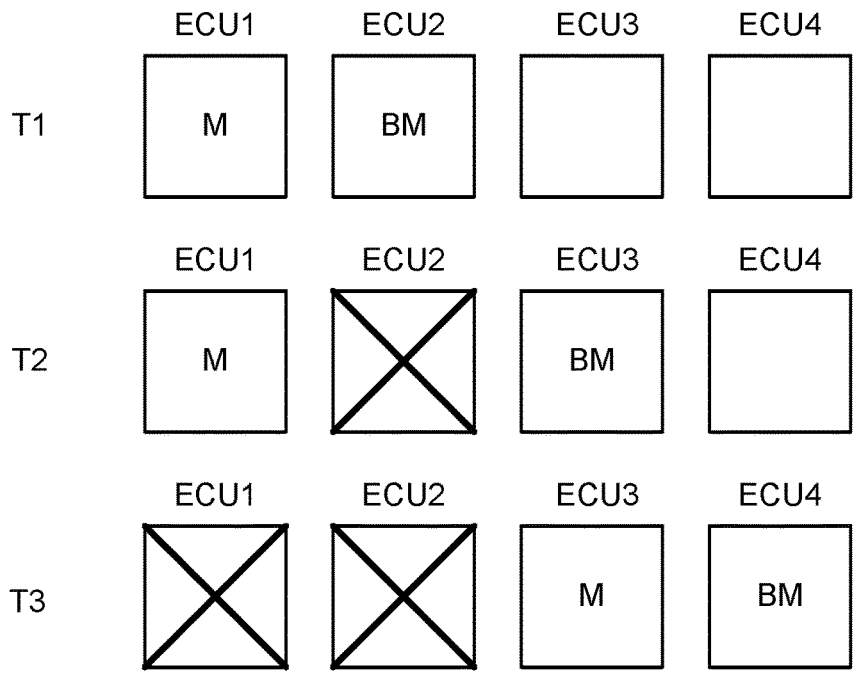
FIG. 7 illustrates exemplary reconfigurations of the master controller and backup master controller for the centralized approach.

FIG. 7 illustrates exemplary reconfigurations of the master controller and backup master controller for the centralized approach. As shown in FIG. 7 in the first time interval, a first controller is assigned the master controller designated by M. The second controller is designated as the backup master controller designated by BM.

At the second time interval, a failure occurs with respect to the current backup master controller BM. In response to the failure, the master controller M assigns the role of the backup master controller to the next operational controller of the ordered set. The third controller is now designated as the new current backup master controller BM.

At the third time interval, a failure occurs with respect to the first controller functioning as the master controller M. In response to the master controller failure, the third controller functioning as the current backup master controller BM is reconfigured to function as the new master controller P. In addition, the next operational controller of the ordered set of the backup controllers is assigned the current backup master controller BM. This may continue for as many backup master controllers that are available in the system.

Figure 8:
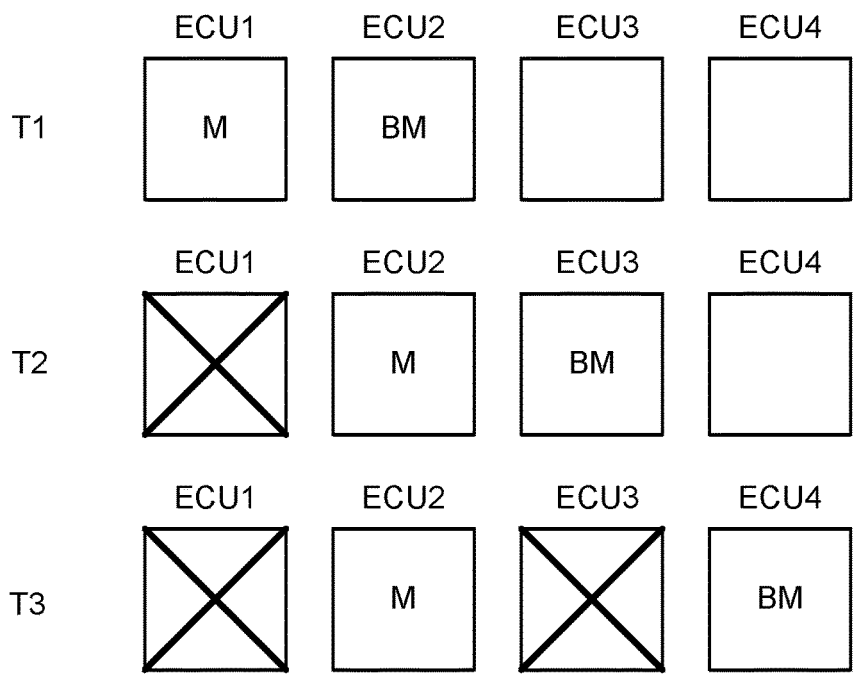
FIG. 8 illustrates exemplary reconfigurations of the master controller and backup master controller for the centralized approach.

FIG. 8 illustrates another exemplary reconfiguration of the master controller and backup master controller for the centralized approach. In FIG. 8 at the first time interval, a first controller is assigned the master controller designated by M. The second controller is designated as the backup master controller and is designated by BM.

At the second time interval, a failure occurs with respect to the first controller functioning as the master controller M.

In response to the master controller failure, the second controller functioning as the current backup master controller BM is reconfigured to function as the new master controller M. In addition, the next operational controller of the ordered set of the backup master controllers (i.e., third controller in this example) is assigned the current backup master controller BM.

At the third time interval, a failure occurs with respect to the third controller functioning as the current backup master controller BM. In response to this failure, the next operational controller of the ordered set of the backup master controllers (i.e., fourth controller) is reconfigured as the current backup master controller BM. This may continue for as many backup master controllers that are available in the system. While certain embodiments of the present invention have been described in detail, those familiar with the art to which this invention relates will recognize various alternative designs and embodiments for practicing the invention as defined by the following claims.

What is claimed is:

1. A method for fault tolerant controller readiness comprising the steps of:
executing functions, by a first controller, while operating under non-fault operating conditions, the first controller operating in a primary status mode, the first controller outputting control signals over a communication network to execute control actions;
operating in a hot standby status mode by a second controller under normal operating conditions, the second controller mirroring the first controller by executing functions to operate as a redundant controller;
operating in a cold standby status mode by at least one backup controller under normal operating conditions;
reconfiguring the second controller while operating under normal operating conditions from the hot standby status mode to the primary status mode if a failure occurs in the first controller;
reconfiguring the at least one backup controller operating under normal operating conditions from cold standby status mode to hot standby status mode to operate as a redundant controller in response to the reconfiguring the second controller from the hot standby status mode to the primary status mode;
wherein if any respective controller fails, the respective failed controller enters fail-silent mode.

2. The method of claim 1 further comprising the steps of: detecting a fault in the second controller while operating in the hot standby status mode, wherein the at least one backup controller is reconfigured from the cold standby status mode to the hot standby status mode if a failure occurs in the second controller.

3. The method of claim 1 wherein only one controller can be in the primary status mode at a given instance of time.

4. The method of claim 1 wherein only one controller can be in the hot standby status mode at a given instance of time.

5. The method of claim 1 wherein any number of controllers can be in the cold standby status mode at a given instance of time.

6. The method of claim 1 wherein the at least one backup controller includes a plurality of backup controllers, wherein each of the plurality of backup controllers have a prioritized number.

7. The method of claim 6 wherein a respective backup controller having a highest priority among the plurality of backup controllers is reconfigured from the cold standby status mode to the hot standby status mode in response to detecting a fault in the second controller.

8. The method of claim 7 wherein the respective backup controller reconfigured to operate in the hot standby status mode is reconfigured to operate in the primary status mode if a fault is detected in a current controller operating in primary status mode.

9. The method of claim 8 wherein a next respective backup controller operating in cold standby status mode having a next highest priority among the plurality of backup controllers operating under normal operating conditions is reconfigured to operate in the hot standby status mode.

10. The method of claim 9 wherein maintaining a prioritized order of each of the plurality of backup controllers is based on a decentralized approach, wherein each of the plurality of backup controllers independently determines whether a status mode change is required.

11. The method of claim 10 wherein each of the plurality of backup controllers independently determining whether the status mode change is required is performed utilizing a prioritization technique, the prioritization technique comprises the following steps:
assigning an initial prioritization number to each backup controller;
detecting a failure of a controller by each operational backup controller;
determining whether a current prioritization number of the failed controller has a higher priority than a monitoring backup controller;
incrementing a prioritization failure counter for the monitoring backup counter in response to the failed controller having a higher priority than the monitoring backup controller;
determining whether a difference between the assigned prioritization priority number of the monitoring backup controller and a value of the prioritization failure counter is equal to one; and
changing the status mode of the monitoring backup controller to the primary status mode in response to the difference equal to one.

12. The method of claim 11 further comprising the steps of:
determining whether a difference between the assigned prioritization number of the monitoring controller and the value of the prioritization failure counter is equal to two; and
changing the status mode of the monitoring backup controller to the hot standby status mode in response to the difference equal to two.

13. The method of claim 11 further comprising the steps of:
determining whether a difference between the assigned prioritization number of the monitoring backup controller and the value of the prioritization failure counter is greater than two; and
maintaining a cold standby status mode of the monitoring backup controller in response to the difference greater than two.

14. The method of claim 10 wherein a respective controller operating in the hot standby status mode monitors for a fault for a respective controller operating in primary status mode, wherein the respective controller operating in the hot standby status mode is reconfigured to primary standby status mode, and wherein the reconfigured respective controller currently operating in primary status mode reorders the plurality of backup controllers that are operating under normal operating conditions.

15. The method of claim 9 wherein maintaining the prioritized number of each of the plurality of backup controllers is based on a centralized approach, wherein a respective controller operating in the primary status mode maintains a prioritized listing of the backup controllers based on any failed controllers, wherein the respective controller operating in the primary status mode determines whether a status mode change is required for respective backup controller, and wherein a message is communicated from the respective controller operating in the primary status mode to the respective backup controller to reconfigure from a cold standby status mode to a backup standby status mode.

16. The method of claim 1 wherein a failure in a respective controller is reported to an application layer of a control system.

17. The method of claim 1 wherein a failure in a respective controller is output to a user via an output device.

18. A fault tolerant control system comprising:
a first controller operating in a primary status mode, the first controller executing functions and controlling features of devices while operating under non-fault operating conditions;
a second controller operating in a hot standby status mode, the second controller mirroring the first controller by functioning as a backup controller executing the functions;
a third controller operating in a cold standby status mode, the third controller operating in a standby mode not executing the functions;
wherein the second controller while operating under normal operating conditions is reconfigured from a hot standby status mode to a primary standby status mode if a failure occurs in the first controller, wherein the third controller while operating under normal operating conditions is reconfigured from a cold standby status mode to a hot standby status mode if the second controller is reconfigured from the hot standby status mode to the primary standby status mode or if a failure occurs in the second controller while operating in hot standby status mode; and
wherein if any respective controller fails, the respective failed controller enters a fail-silent mode.

19. A fault tolerant control system comprising:
a first controller operating in a primary status mode, the first controller controlling features of devices while operating under non-fault operating conditions;
a second controller operating in a hot standby status mode, the second controller mirroring the first controller by functioning as a backup controller executing redundant functions;
a plurality of backup controllers operating in a cold standby status mode, each of the plurality of backup controllers having a prioritized order, the plurality of backup controllers while operating in a cold standby mode not executing the functions;
wherein the second controller while operating under normal operating conditions is reconfigured from a hot standby status mode to a primary standby status mode if a failure occurs in the first controller, wherein operational backup controller having a highest priority among the plurality of backup controllers is reconfigured from a cold standby status mode to a hot standby status mode if the second controller is reconfigured from the hot standby status mode to the primary standby status mode or if a failure occurs in the second controller while operating in hot standby status mode.

* * * * *

UNITED STATES PATENT AND TRADEMARK OFFICE
CERTIFICATE OF CORRECTION

PATENT NO. : 9,952,948 B2
APPLICATION NO. : 15/078233
DATED : April 24, 2018
INVENTOR(S) : Soheil Samii Page 1 of 1

It is certified that error appears in the above-identified patent and that said Letters Patent is hereby corrected as shown below:

In the Claims

Column 16, Line 33, in Claim 11, "the assigned prioritization priority number" should read
--the assigned prioritization number;--

Signed and Sealed this
Twenty-seventh Day of November, 2018

Andrei Iancu
*Director of the United States Patent and Trademark Office*